United States Patent [19]
Ross et al.

[11] 3,739,392.
[45] June 12, 1973

[54] BASE-BAND RADIATION AND RECEPTION SYSTEM

[75] Inventors: Gerald F. Ross, Lexington; Kenneth W. Robbins, Wilmington, both of Mass.

[73] Assignee: Sperry Rand Corporation, New York, N.Y.

[22] Filed: July 29, 1971

[21] Appl. No.: 167,400

[52] U.S. Cl. ............... 343/840, 343/5 PD, 343/807
[51] Int. Cl. .......................................... H01q 19/12
[58] Field of Search .................. 343/795, 807, 809, 343/840, 5 PD

[56] References Cited
UNITED STATES PATENTS 2,494,691  1/1950  Cork et al. .......................... 343/840
3,512,155  5/1970  Bloice ..................................... 343/8
2,454,766  11/1948  Brillouin ............................ 343/786
2,430,353  11/1947  Masters .............................. 343/795

*Primary Examiner*—Eli Lieberman
*Attorney*—S. C. Yeaton

[57] ABSTRACT

A base-band transmitter and receiver antenna system for operation in subnanosecond pulse radio systems of the type detecting the presence or range of near-by reflecting objects utilizes directive, dispersionless, broad band traveling wave transmission line radiator and receiver antenna elements arranged cooperatively to limit the effect of base-band energy directly coupled from the transmitter to the receiver.

10 Claims, 6 Drawing Figures

Patented June 12, 1973

INVENTORS
GERALD F. ROSS
KENNETH W. ROBBINS
BY
H P Terry
ATTORNEY

Patented June 12, 1973

INVENTORS
GERALD F. ROSS
KENNETH W. ROBBINS
BY

ATTORNEY 3,739,392

BASE-BAND RADIATION AND RECEPTION SYSTEM

BACKGROUND OF THE INVENTION

1. Field of the Invention

The invention pertains to a cooperative traveling wave antenna system for the transmission and reception of base-band or subnanosecond electromagnetic pulses relative to reflecting objects.

2. Description of the Prior Art

In the prior art object detection and ranging systems, it is common practice to irradiate an object to be detected with pulses of electromagnetic energy containing many carrier frequency cycles, and to determine the presence of such an object or its distance from the object detection system as a function of the time interval between the envelopes of corresponding transmitted and received pulses. These transmitted pulses are highly energetic and active electronic duplexer means must be provided fully to block the receiver for an appreciable time such as, for instance, 1 microsecond, precluding the reception of echo pulses until after the transmitted pulse has decayed. In the case of an object detection system employing 1 microsecond duration transmitted pulses, the receiver is fully blocked for slightly longer than 1 microsecond, rendering the receiver insensitive to objects closer than, say, several hundred feet. Because such prior art transmitters use high level pulse transmission, they also have the undesired feature of rendering a considerable portion of the high frequency spectrum useless for communication and other desirable purposes.

SUMMARY OF THE INVENTION

The invention pertains to antenna systems for radio pulse object detectors of a novel kind so constructed and arranged as to afford sensing of near-by objects without interference with conventional types of radio communication systems and, in turn, being substantially unaffected in normal operation by the radiations of other radio frequency systems or by ambient electrical noise signals. Cooperating individual transmitter and receiver traveling wave antenna elements are employed, each of a novel type embodying non-dispersive transmission line systems for propagating without substantial distortion subnanosecond electromagnetic pulses and for launching or receiving such base-band traveling wave pulses toward or from a reflecting obstacle. The transmission line elements cooperate with collimating and isolating elements for generating a subnanosecond duration pulse of distinctive character particularly adapted for processing by an associated base-band receiver without the necessity of use of conventional duplexers.

DESCRIPTION OF THE PREFERRED EMBODIMENTS

Figures 1, 2, 3, 4:
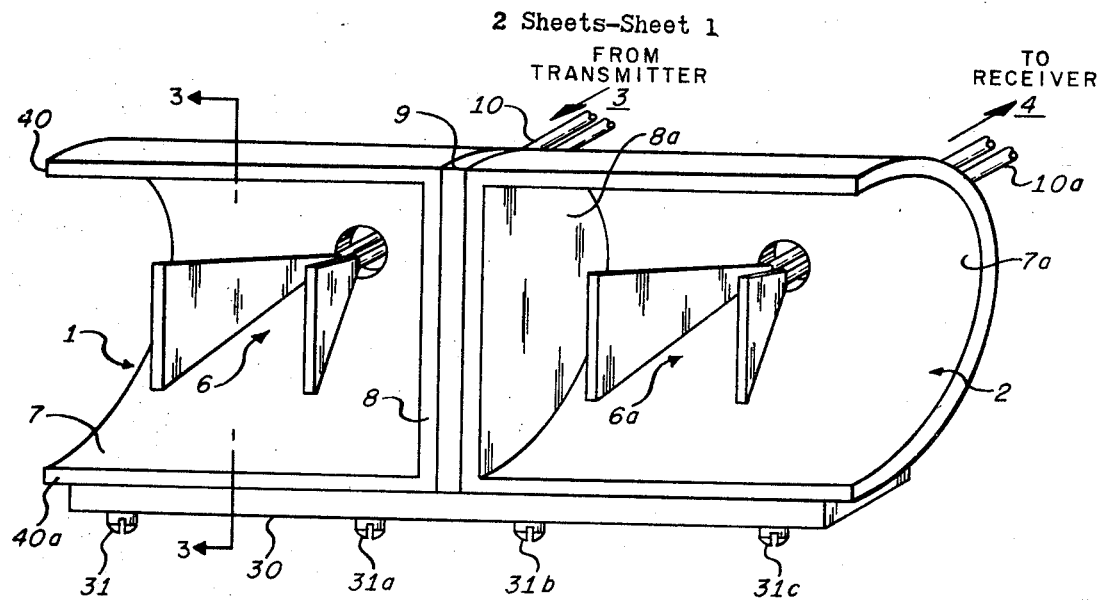
FIG. 1 is a perspective view of the novel traveling wave antenna system.
FIG. 2 is a plan view of the apparatus of FIG. 1, showing its interconnections with a transmitter-receiver system.
FIG. 3 is a cross section view taken along the line 3—3 of FIG. 1.
FIG. 4 is a perspective view of a part of the traveling wave antenna of FIGS. 1, 2, and 3.

FIGS. 1, 2, and 3 illustrate a base band transmitter and receiver traveling wave antenna system such as has particular application in certain subnanosecond radio communication systems, including the kind which detect the presence of a near-by object and may, in addition, provide a measure of its distance from a reference plane of the radio system. For example, the transmitter antenna 1 may be employed with a base-band transmitter or subnanosecond pulse generator 3 such as that of the G. F. Ross, D. Lamensdorf U.S. patent application Ser. No. 46,079 entitled "Balanced Radiator System", filed June 15, 1970, issued Apr. 25, 1972 as U.S. Pat. No. 3,659,203 and assigned to the Sperry Rand Corporation. Other kinds of short electromagnetic pulse generators may be employed, including the devices of the G.F. Ross, J.DeLorenzo U.S. patent application Ser. No. 65,551 entitled "Generator for Short Duration High Frequency Pulse Signals", filed Aug. 20, 1970, issued Oct. 12, 1971 as U.S. Pat. No. 3,612,899 and also assigned to the Sperry Rand Corporation. Likewise, the receiver antenna 2 may be used with a cooperating base band receiver 4 of the type adapted to receive subnanosecond electromagnetic pulses, such as the short pulse receiver disclosed in the G.F. Ross U.S. patent application Ser. No. 137,355, entitled "Energy Amplifying Selector Gate for Base Band Signals", filed Apr. 26, 1971, or in the K.W.Robbins U.S. patent application Ser. No. 123,720, entitled "Short Base Band Pulse Receiver", filed Mar. 12, 1971 and issued May 9, 1972 as U.S. Pat. No. 3,662,316. The latter two patent applications are assigned to the Sperry Rand Corporation.

Transmitters of the type which may be used as transmitter 3 may utilize a non-dispersive traveling wave transmission line system for generation of base-band or subnanosecond pulses of electromagnetic energy and for their radiation into space, cyclic energy storage on the transmission line and alternate cyclic energy radiation therefrom being employed. The transmission line may itself function as a non-dispersive radiator, launching the subnanosecond impulses into space with substantially no distortion. Such base-band pulses have an extremely wide energy spectrum; while the total energy content of any given transmitted base-band pulse may be considerable, the few spectral lines falling within the relatively narrow pass band of a conventional receiver are of low amplitude and have substantially no effect thereon.

A receiver suitable for use as receiver 4 for detecting and utilizing such short base-band electromagnetic pulses may also employ a dispersionless traveling wave transmission line antenna, with a utilization circuit cooperating with a biased semiconductor detector element coupled to the antenna transmission line for instantaneously detecting substantially the total energy of a received base-band pulse of particular polarity and for supplying a corresponding output suitable for application to presence or range measuring or indicating circuits. The receiver antenna system supplies substantially the total energy of each undistorted received base-band pulse directly to the receiver detector; thus, the receiver is adapted to operate successfully with pulse signals having a very wide spectral extent. Further, the receiver may operate with base-band pulse signals having spectral components that are each of such low individual energy content as to escape detection by conventional relatively narrow band receivers. The total energy in each base-band pulse can, however, be relatively larger than the level of noise or other interfering pulses or signals in the vicinity of the base-band receiver in a given time interval. Thus, by appropriately adjusting the output level of the object detector transmitter and the sensitivity or threshold of the object detector receiver, base-band signals not affecting other receivers are readily transmitted, received, and detected without the object detector receiver, in turn, being affected in any substantial degree by other radio energy transmissions.

The antenna arrangement of the present system may be used in a variety of applications of the above mentioned base-band pulse transmitters and receivers, as in presence detectors for vehicular or pedestrian traffic control or in intrusion alarm systems, and also in devices for measuring other characteristics of near-by objects. One such application, for example, is found in the apparatus of the G.F.Ross United States patent application Ser. No. 134,990, entitled "Base Band Pulse Object Sensor System", filed Apr. 19. 1971 and assigned to the Sperry Rand Corporation. A second example is found in the G.F.Ross U.S. patent application Ser. No. 145,154, entitled "Vehicle Safety Apparatus", filed May 20, 1971 and assigned to the Sperry Rand Corporation.

Still referring to FIGS. 1, 2 and 3, the traveling wave transmitter antenna 1 is seen to comprise a radiating element 6 cooperating with a collimating parabolic cylinder element 7 one end of which is closed by a flat wall 8. The end of parabolic cylinder element 7 opposite flat wall 8 is not similarly closed, but remains open to space. The parabolic cylinder element 7 and wall 8 are constructed of material such that their operating surfaces are highly conducting to permit flow of high frequency currents. It will be understood by those skilled in the art that the proportions, relative or absolute, shown in the figures are selected as convenient for illustrating the invention, and do not necessarily represent choices that would be selected in actual practice.

The traveling wave receiver antenna 2 is generally similar to transmitter antenna 1 and may be substantially a mirror image replica thereof. It consists of a receiving element 6a cooperating with a collimating parabolic cylinder element 7a one end of which is closed by flat wall 8a. The end of collimating parabolic cylinder element 7a opposite flat wall 8a is open to space, cylinder element 7a and wall 8a being constructed so that their operating surfaces are highly conducting for high frequency electrical currents. Antennas 1 and 2, in addition to being separated by conducting walls 8, 8a, are further separated by a sheet 9 of dielectric insulating material, sheet 9 being sandwiched between walls 8 and 8a. The structure may be held together in any convenient manner, as by employing non-metallic braces such as the elongated brace 30 fastened to antennas 1 and 2 by suitable fasteners 31, 31a, 31b, 31c.

The transmitting and receiving antenna elements 6 and 6a are shown in greater detail in FIG. 4. For example, the transmitter element 6 and its associated transmission line, which is shown as a dual wire line 10, may take the form shown in FIG. 4, where transmitter antenna element 6 comprises a structure having mirror image symmetry about a median plane at right angles to the direction of the vector of the electric field propagating out of antenna element 6. The same type of symmetry presides generally in the cooperating transmission line 10 which comprises parallel wire transmission line conductors 20 and 20a; conductors 20 and 20a are spaced wire conductors constructed of a material capable of conducting high frequency current with substantially no ohmic loss. Furthermore, conductors 20 and 20a are so constructed and arranged as to support TEM mode propagation of high frequency energy, with the major portion of the electric field lying between conductors 20 and 20a.

The TEM transmitter antenna element 6 preferably consists of a pair of flared, flat, electrically conducting planar members 21 and 21a. Members 21 and 21a are, for example, generally triangular in shape, member 21 being bounded by flared edges 22 and 23 and a base or frontal aperture edge 24. Similarly, member 21a is bounded by flaring edges 22a and 23a and a frontal aperture edge 24a. Frontal aperture edges 24 and 24a may be straight or arcuate. Each of the planar triangular members 21 and 21a is slightly truncated at its apex, the truncations 29 and 29a being so constructed and arranged that conductor 20 is smoothly joined without overlap at truncation 29 to planar member 21. Likewise, conductor 20a is smoothly joined without overlap at truncation 29a to planar member 21a. It is to be understood that the respective junctions at truncations 29 and 29a are formed using available techniques for minimizing impedance discontinuities corresponding to the junctions. It is also to be understood that the flared members 21 and 21 a of antenna element 6 are constructed of material highly conductive for high frequency currents.

The planar transmitter elements 21 and 21a of antenna element 6 are coupled in impedance matched relation to the two wire transmission line 10. Transmission line 10 is arranged to have the same impedance as the transmission line comprising antenna elements 21 and 21a. Transmission line 10 may have its parallel wire conductors 20 and 20a molded into a dielectric enclosing element 33 for the purpose of accurately determining the separation of conductors 20 and 20a so that transmission line 10 has a constant impedance along its length. Dielectric element 33 may be surrounded, in turn, by a braided or other conductive shield 34 which may be grounded at any convenient location. Shield 34 may, in turn, be surrounded by a protective plastic cover element 35 of the well known type. In the case of transmitter antenna 1, transmitter antenna element 6 is coupled via the dual wire transmission line 10 to transmitter 3.

The traveling wave receiver antenna 2 may be generally similar in structure to transmitter antenna 1 with the above noted exception that antennas 1 and 2 are substantially mirror images. In receiver antenna 2, receiver antenna element 6a has triangular planar members respectively connected by the wires of dual wire transmission line 10a to receiver 4. On the other hand, the traveling wave receiver antenna element 6a may not be entirely identical in dimensions or other parameters to the transmitter antenna element 6, since their adjustments may depend upon obtaining an optimum impedance match between the respective antenna elements and receiver 4 and transmitter 3. For example, the angle between the planar members 21 and 21a for antenna element 6a may be 120° if it is desired to match element 6a to a receiver 4 having a 150 ohm input impedance. If, for example, antenna element 6 is to be matched to the output impedance of a representative base-band transmitter 3, a 130° angle is used for antenna element 6.

Figure 5:
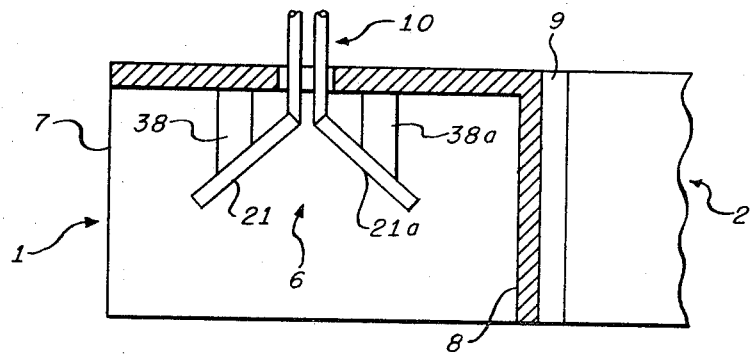
FIG. 5 is a cross section view taken along the line 5—5 of FIG. 3.

In constructing the transmitter-receiver antenna configuration of FIG. 1, it will be apparent to those skilled in the art that the interior volumes of antennas 1 and 2 may be filled with an air foamed dielectric material exhibiting low dielectric loss in the presence of high frequency fields, such material acting, for example, to support planar conductor 21 in fixed relation with respect to conductor 21a. Alternatively, the conductive elements of antennas 1 and 2 may be fixed in spaced relation by dielectric spacers (not shown) which cooperate in forming enclosing walls for the configuration of FIG. 4, thereby protecting the interior conducting surfaces of antennas 1 and 2 from the effects of precipitation or corrosion. Various other kinds of supports for the triangular planar elements 21, 21a may be employed, including the arrangements shown in FIG. 5 wherein dielectric braces 38, 38a precisely determine the location of the respective planar elements 21, 21a with respect to parabolic cylinder 7. The braces 38, 38a may be attached to cylinder 7 and to planar elements 21, 21a by use of a conventional cement or by other fastener means.

In operation, a base-band or subnanosecond traveling pulse generated in transmitter 3 may be fed via transmission line 10 to the planar elements 21, 21a of transmitter antenna element 6, at the effective aperture of which energy is thereupon radiated into space. If a reflecting object is present within the radiation pattern, an echo signal will be formed that may be collected by receiver antenna element 6a for supply to transmission line 10a and to receiver 4. Examining first the operation of transmitter antenna 1, it will be appreciated that modes of operation present in ordinary continuous wave or long pulse types of antennas are not of prime significance in an antenna of the type of antenna 1, and that the concepts of time domain behavior and total energy of a signal pulse wave form generally replace the more conventional notions that are expressed in terms of signal intensity at a given frequency.

The planar triangular elements 21, 21a forming transmitter antenna element 6 have several characteristics which are particularly useful for the transmission (or reception) of traveling wave subnanosecond duration signals. As a transmitting antenna element, element 6 allows a pulse excitation at its apex (at truncations 29, 29a) to propagate, with virtually no distortion, to the frontal or aperture ends 24, 24a of the element where a wave discontinuity and therefore radiation occurs. Unlike the prior art wire antennas such as the monopole and dipole antenna, the dispersionless TEM antenna element 6 has a greater degree of directivity both in azimuth and elevation. It can, by virtue of the reciprocity theorem, also receive energy incident along its bore sight or axis of symmetry. The utilized phenomenon of wave reversal and consequent instantaneous radiation is discussed in detail in the above-mentioned U.S. patent application Ser. No. 65,551.

When used with the parabolic cylinder element 7, the effective aperture of the radiating antenna element 6 is placed substantially in the focal line of parabolic cylinder 7. A direct subnanosecond signal of one polarity is radiated into the far field by the antenna element 6; but it has been observed that a much larger signal of reversed polarity is generated due to the presence of parabolic cylinder 7. This larger amplitude pulse signal arrives in the far field shortly subsequent to the arrival of the directly radiated signal. While other explanations may be found for the generation of the large wave and of other waves, the large wave being the desired wave for certain applications of the antenna system, it will be seen that progressive traveling waves also travel in the region between antenna element 6 and parabolic cylinder 7, generating traveling current waves along the walls of the element 6 and cylinder 7. Such waves continue to propagate to the frontal aperture edges 40, 40a of parabolic cylinder 7 and are reversed thereat to flow toward the truncations of element 6. Waves trapped in this region may give rise to the primarily useful radiated subnanosecond pulse, and to subsequently radiated time domain side lobe radiation patterns of relatively but not otherwise undesired low level. Operation of the receiver antenna 2 will be readily understood from the foregoing by those skilled in the art in view of the reciprocity theorem.

Figure 6:
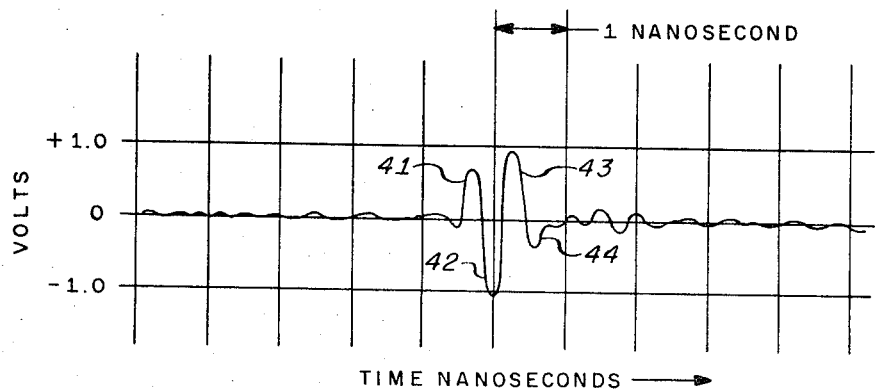
FIG. 6 is a graph useful in explaining the operation of the invention.

As previously noted receiver antenna 2 may be employed with a subnanosecond pulse receiver of the type described in the aforementioned U.S. patent application Ser. No. 137,355 or Ser. No. 123,720, for example, such receivers being specially adapted to detect substantially the total energy of a received base-band pulse of particular polarity and having an amplitude exceeding a nominal threshold value. A typical oscilloscope display derived from the received signal pattern before signal processing in such a receiver is seen in FIG. 6. As a model reflector, a flat copper sheet 2 feet 3 inches by 2 feet 7 inches was used as a reflector, being placed 6 feet 6 inches from the receiver-transmitter system. If the above-suggested theory of operation is accepted, one may assume that the positive subnanosecond pulse 41 is due to the direct radiation of energy from antenna element 6, while the larger negative subnanosecond pulse 42 represents radiation of energy collimated primarily by parabolic reflector 7. Subsequent positive and negative excursions 43 and 44 may originate in multiple path reflections within the transmitter antenna 1. Similar modifications take place, according to the reciprocity theorem, within receiver antenna 2. It is to be noted that the response seen in FIG. 6 is a combined response modified to an extent by the antennas and their environment, and is therefore the convolution of several transfer functions.

It is noted that one large negative excursion 42 is available for processing by a receiver adapted to receive only negative subnanosecond pulses, the negative pulse 44 and other subsequent negative excursions being considerably smaller so as to be excluded by conventional or other threshold means. The two large amplitude subnanosecond pulses 41 and 43 are ignored by the appropriately polarized receiver circuit, pulse 42 being the signal useful in whatever signal processing circuits are employed by the receiver, such as the ranging circuits of the above-mentioned patent application Ser. No. 137,365.

A major function of parabolic cylinders 7, 7a lies in providing isolation between the transmitter 3 and receiver 4. To this end, the proximate end walls 8, 8a for the respective cylinders 7 and 7a also furnish additional isolation, walls 8, 8a being separated by insulator sheet 9. Walls 8, 8a and insulator sheet 9 are particularly beneficial in preventing damage of receiver 4 by the high level signals generated in transmitter 3 and also in preventing undesired tripping of the threshold detector of receiver 4. In one form of the invention, an isolation of 74 dB has been attained according to this design. The ends of cylinders 7 and 7a opposite the respective walls 8, 8a are deliberately left open to space so as to prevent an undesired type of multiple reflection within the volume of antenna 1, for instance.

It is seen that the novel base-band antenna-receiver traveling wave antenna system is particularly adapted for use in subnanosecond pulse radio systems of the kind used for detecting the presence or the range of near-by objects. In the novel antenna system, cooperating individual transmitter and receiver antanna elements are employed which comprise non-dispersive, broad band, traveling antenna transmission line arrangements for propagating, substantially without distortion, subnanosecond electromagnetic pulses and for launching or receiving such base-band pulses toward or from a reflecting obstacle. It is seen that the traveling wave transmission line arrangements are used cooperatively with collimating elements for generating one subnanosecond pulse of distinctive character for processing by an appropriate base-band pulse receiver without the use of a conventional duplexer or other elements for protection of the receiver from the transmitted pulse.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. Object sensor means comprising:
subnanosecond signal generator means,
dispersionless transmission line antenna means responsive to said subnanosecond signal generator means for transmitting a subnanosecond signal into space and including:
first and second substantially triangular conductor means having relatively closely spaced apices and flared-apart base aperture edges for forming a transmission line having a constant impedance therealong,
said conductor means forming a radiating antenna having an effective radiation center, and
dispersionless dual conductor transmission line means for supplying subnanosecond signals to said apices,
collimation means responsive to said transmission line antenna means for transmitting a collimated subnanosecond signal into space toward said reflecting object and including:
cylindrical parabolic conductor means having a focal line passing through said effective radiation center,
said parabolic cylinder means having a flat conductive wall at a first end thereof, the second end of said parabolic cylinder means being open to space, and
dielectric support means for supporting said triangular conductor means in fixed relation to said parabolic cylinder means, and
receiver means responsive selectively to a reflected version of said collimated subnanosecond signal.

2. Apparatus as described in claim 1 wherein said transmission line antenna means has a plane of symmetry at substantially right angles to said focal line.

3. Apparatus as described in claim 2 wherein said receiver means comprises:
dispersionless transmission line receiver antenna means, and
receiver signal collimation means.

4. Apparatus as described in claim 3 wherein said dispersionless transmission line receiver antenna means comprises:
first and second substantially triangular conductor means having relatively closely spaced apices and flared-apart base aperture edges for forming a transmission line having a constant impedance.
said conductor means forming a receiving antenna having an effective energy reception center,
dielectric support means for supporting said triangular conductor means, and
dispersionless dual conductor transmission line means for propagating received subnanosecond signals from said apices.

5. Apparatus as described in claim 5 further including receiver collimation means for coupling received collimated subnanosecond signals to said transmission line receiver antenna means.

6. Apparatus as described in claim 5 wherein said receiver collimation means comprises:
cylindrical parabolic conductor means having a focal line passing through said effective reception center,
said cylinder having a flat conductive wall at a first end thereof, the second end of said cylinder being open to space, and
dielectric support means for supporting said receiver antenna triangular conductor means in fixed relation to said parabolic cylinder means.

7. Apparatus as described in claim 6 wherein said receiver transmission line antenna means has a plane of symmetry substantially at right angles to said focal line.

8. Apparatus as described in claim 7 wherein said collimating transmitter parabolic cylinder flat wall and said collimating receiver parabolic cylinder flat wall are spaced side-by-side in fixed parallel relation by an electrical insulator sheet so that the respective focal lines of said transmitter and receiver parabolic cylinders are substantially collinear.

9. Apparatus as described in claim 8 further including receiver circuit means adapted to respond only at the receipt of a collimated subnanosecond duration signal of predetermined polarity.

10. Object sensor means comprising:
subnanosecond signal generator means,
dispersionless transmission line antenna means responsive to said subnanosecond signal generator means for transmitting a direct subnanosecond signal into space and including:
first and second substantially triangular conductor means having relatively closely spaced apices and flared-apart base aperture edges for forming a transmission line having a constant impedance therealong, said conductor means forming a radiating antenna having an effective radiation center, and dispersionless dual conductor transmission line means for coupling subnanosecond signals to said apices, collimation means responsive to said transmission line antenna means for transmitting a collimated subnanosecond signal into space toward said reflecting object, and receiver means coupled with the collimating means and responsive selectively to a reflected version of said collimated subnanosecond signal.

* * * * *